July 16, 1957 F. FRUENGEL 2,799,760
METHOD AND DEVICE FOR HIGH-FREQUENCY SOLDERING
AND INDUCTION HARDENING
Filed Dec. 3, 1952 2 Sheets-Sheet 1
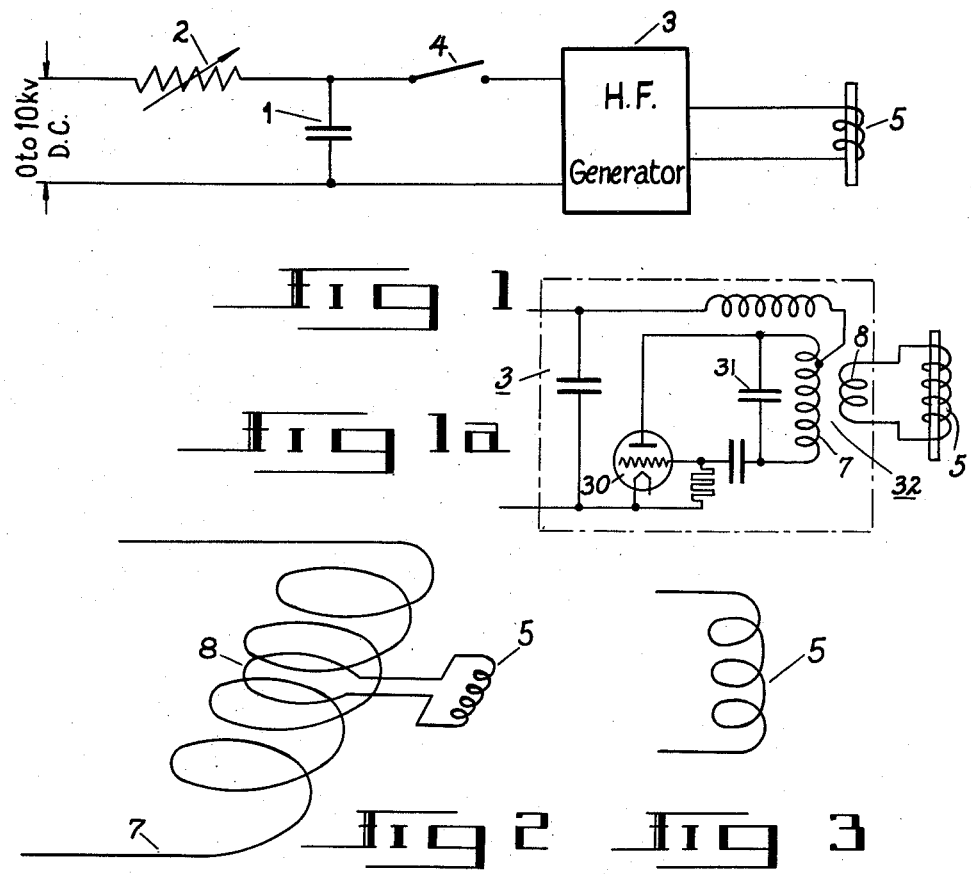
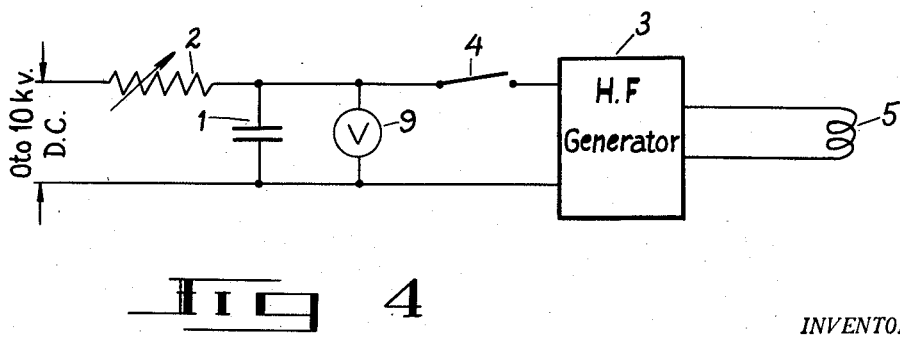
INVENTOR.
FRANK FRUENGEL
BY William H. Keener
AGENT July 16, 1957  F. FRUENGEL  2,799,760
METHOD AND DEVICE FOR HIGH-FREQUENCY SOLDERING
AND INDUCTION HARDENING
Filed Dec. 3, 1952  2 Sheets-Sheet 2
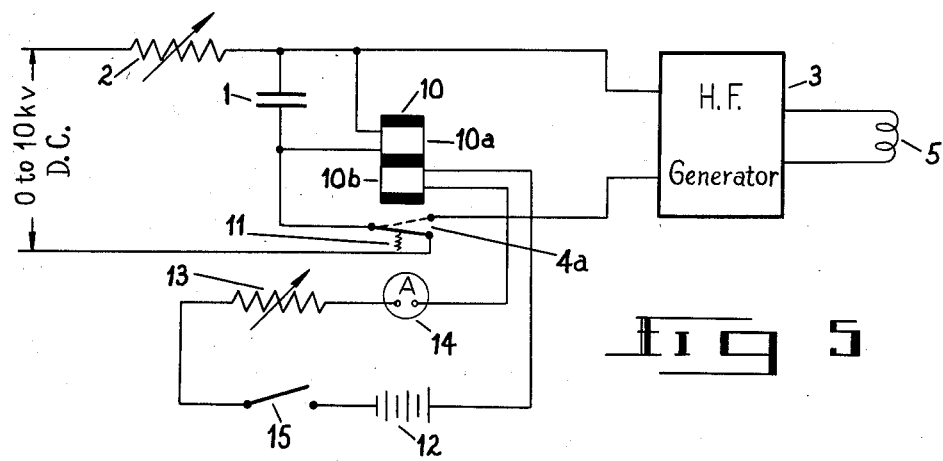
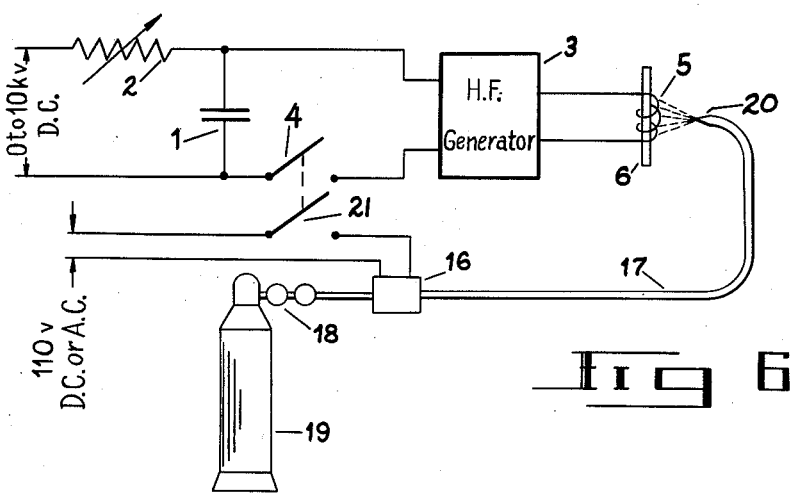
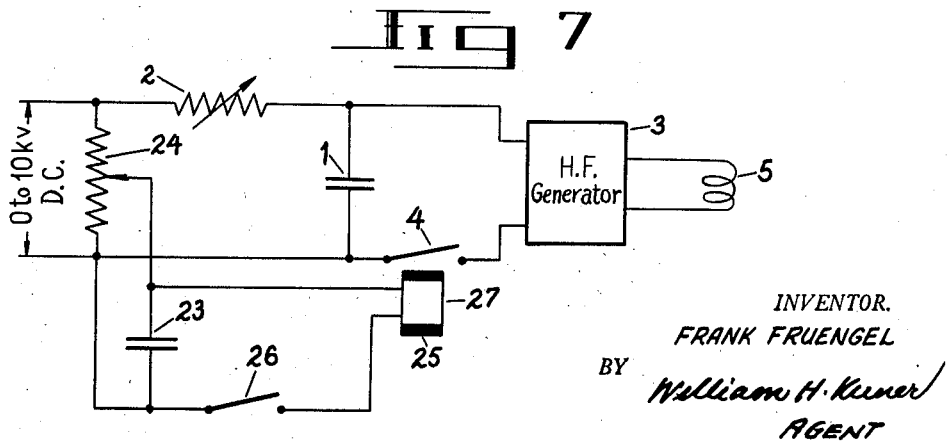
INVENTOR.
FRANK FRUENGEL
BY
William H. Kerner
AGENT

United States Patent Office 2,799,760
Patented July 16, 1957

2,799,760

METHOD AND DEVICE FOR HIGH-FREQUENCY SOLDERING AND INDUCTION HARDENING

Frank Fruengel, Hamburg-Rissen, Germany

Application December 3, 1952, Serial No. 323,811

6 Claims. (Cl. 219—10.75)

This invention relates to high-frequency induction or eddy-current hardening, and more particularly to the application of induction heating in soldering, brazing, or hardening of very small work pieces which are so small that the term "micro induction hardening" may be properly applied to the process of this invention.

The application of high-frequency or eddy-currents for purposes such as soldering, brazing, or hardening of metallic work pieces is generally known. In principle, heating by induction in such cases is effected in that a continuous flow of work pieces or parts is passed along a heater or through a heater coil carrying high-frequency current, whereby the parts are heated by the eddy-currents induced therein. If acceptable hardening is to be obtained, the flow of parts must be at a defined rate of speed and in a defined relation to the heater or work coil in order to achieve a constant hardening temperature and not to overheat the parts. If heating in a continuous flow of parts is not possible or not advisable, it is customary to work with an accurate time control and introduce so an exact amount of heat into the work, or more precisely, into the surface layer of the part to be hardened and then quench the part or let it cool fast enough so that it becomes hardened by conduction of the heat into its center that by action of skin effect remained cold during heating. This method of introducing a given amount of heat into the work is especially suitable for hardening very small parts, demands, however, extreme care in adhering to a given exact heating time because any deviation therefrom results in hardening failures. Such accurate metering of heat represents a difficult problem, especially when such small amounts are involved as are necessary for hardening minute parts, such as watch pins or pivots, or for effecting precision solderings or brazings. Such minute objects, especially when desiring hardened surfaces of micron thickness, necessitate very high frequencies and exact ultra-short heating durations in order to prevent excessive penetration of the heat by conduction into the center of the part. Durations in the range of $1/100$ to $1/1000$ second are the rule and it is necessary to vary such durations accurately in order to suit different hardening requirements. Such accurate control is very difficult to obtain and presents a problem which, up to now, has prevented extensive use of induction heating in the field of precision soldering, brazing, and hardening of minute work pieces.

It is a principal object of this invention to provide accurate heat measuring and metering means for induction heating by employing condenser discharges as power supply for a high-frequency generator from which in turn each discharge impulse, converted into high-frequency energy and being equivalent to an exactly predetermined amount of heat, reaches the heater coil where it becomes effective in heating a given work piece. Thus, the method provided by this invention may also be specified as impulse hardening and this term is applied in the following description.

Another object is to relate frequency and duration of a heating impulse in such a manner that higher temperatures than ordinarily applied in hardening are momentarily reached, but this in a micron-thin skin of the work piece only, so that the cold-remaining center can absorb this heat readily without gaining hardening temperatures itself; and this quick enough so that the outer skin becomes hardened without quenching and does not suffer from the higher temperatures it had obtained.

Another object is to provide an induction heating conductor or heater coil for heating minute work pieces, which is well adapted to the tuned inductance or output coil of the oscillator circuit of the high-frequency generator in that its self-inductance is at least equal to or higher than the self-inductance of the output coil; and which heater coil consists of one or several turns of very thin silver or copper wire of circular or flat cross-section having such heat capacity that its temperature reached during one heating impulse does not surpass its maximum operating temperature, and that this heat is dissipated by suitable cooling means during the intervals between the heating impulses or parts thereof.

Another object is to provide means by which it is possible to let the variable charging voltage of the condenser indicate directly in joules, calories, or, in case of always similar work pieces, in surface temperatures, the heating energy becoming effective at a certain given charging voltage.

Another object is to provide an automatic adjusting means for the charging voltage, which means simultaneously blocks the release of the discharge pulse until such instant at which a predetermined given voltage prevails.

Another object is to provide electro-pneumatic or mechanical means for controlling a protective stream of hydrogen or noble gas in such a way that it impinges upon the work piece immediately before, during, and after the hardening impulse in order to prevent oxidation of the work and, in particular cases, to assist in carrying off the heat arising in the heater coil.

A further object is to provide a relay for switching the condenser discharge upon the high-frequency generator, which relay is actuated by the discharge of an auxiliary condenser whose charging energy is so dimensioned that it is substantially sufficient to move the switch contacts of said relay into engagement and to cover additionally just the mechanical losses arising in connection with such movement.

Still a further object is to provide in the high-frequency generator, electronic vacuum tubes having high cathode emission, and which preferably are triodes with thoriated tungsten cathodes whose emission permits the flow of high discharge currents and thus discharge of the storage condenser in less than $1/100$ second.

Still other objects, features, and advantages will become apparent from the following detailed description to be read in connection with the accompanying drawings which, by way of example, illustrate diagrammatically some preferred embodiments of this invention and in which Fig. 1 is a showing of the simplest form of a circuit for the present impulse induction hardening method;

Fig. 1a shows a typical internal wiring diagram of a conventional vacuum-tube high-frequency generator which preferably may be employed for the purpose of this invention;

Fig. 2 shows the relative arrangement of the inductance coil of the high-frequency set and the heating conductor or work coil;

Fig. 3 is a perspective view of a heater coil as used in the micro induction hardening process, of this invention, drawn approximately to a ten-times-enlarged scale;

Fig. 4 is a circuit diagram for impulse induction hardening illustrating a preferred way of indicating the energy content of the condenser by means of a voltmeter calibrated in joules or calories;

Fig. 5 is a circuit diagram for impulse induction hardening illustrating the voltage control and blocking means for obtaining uniform condenser charges and exactly measured heat quantities;

Fig. 6 shows the arrangement of a protective noble gas supply as interconnected with the switching means of the discharge circuit so that the gas stream impinges upon the work piece only during actual heating;

Fig. 7 is a modified circuit diagram for impulse induction hardening in which closing of the condenser discharge circuit is caused by a relay energized by the discharge of an auxiliary condenser whose energy content may be varied.

Referring to the drawings, there identify like reference numerals like elements throughout the several circuit diagrams shown. The storage condenser 1 is continually charged from a suitable direct-current high-voltage source whose voltage can be controlled and adjusted within a wide range (for instance, from 0 to 10 kilovolts) by any suitable and well-known means. The charging rate of the condenser is limited by a resistor 2 in order to prevent the inrush of heavy current at the instant at which the condenser is discharged. The condenser 1 is connected for discharge into a high-frequency generator 3, and discharge pulses can be released by closing a switch indicated generally at 4. The high-frequency generator converts each discharge pulse into high-frequency energy in an incorporated oscillating circuit of well-known construction which is coupled with the heater coil 5. The work piece or part 6, which is to be hardened or soldered, is brought into this heater coil 5 and is heated by eddy-currents induced by the condenser discharge that has been converted into high-frequency current by the interposed high-frequency generator 3. Since the efficiency of the high-frequency set 3 is constant so long as no changes in the components of its circuit are effected, the heat produced in the work 6 is directly proportional to the electrical energy charge released from the condenser. Thus it will be understood that by properly adjusting the condenser charge, which is directly proportional to the square of the charging voltage, the heating effect can be closely regulated.

The high-frequency generator as employed for the induction heating method of this invention is of the conventional self-excited thermionic-vacuum-tube type; practically the only type suitable for producing frequencies of the order necessary for the present method. The network of the high-frequency generator can take various well-known forms, and a simple circuit is shown by way of example only in Fig. 1a. Here the thermionic vacuum tube 30, a suitable transmitter tube having high cathode emission, is shown as a triode, but tetrodes or pentodes can also be used if somewhat modified circuits are employed. The tuned oscillator output circuit includes the oscillator condenser 31 and the inductance coil 7 which forms also the primary of a high-frequency transformer 32. To the secondary 8 of transformer 32 there is connected the induction heater element or heater coil 5. Since the high-frequency generator itself contains no features of this invention, a further description of its network is deemed to be unnecessary here.

Discharge and conversion of the stored condenser charge through the high-frequency generator take place very rapidly; durations between $10^{-2}$ and $10^{-4}$ second for the entire heating impulse are readily attainable. The following example may serve as an illustration of the factors involved:

A drop of tin weighing 0.2 gram shall be heated so much that it not only melts but that it also flows freely into intimate contact with the surface on which it lies. To heat such tin globule to about 400 degrees centigrade, which is well above the melting point, requires presumably about 15 B. t. u. or 16 joules. Assuming an efficiency of 10 percent for the whole arrangement, the condenser charge must accordingly be 160 joules. When working with a generator vacuum tube which will stand short-time pulses of 10 kilovolts, the necessary capacitance of the condenser can be computed according to the formula: $\frac{1}{2}CE^2=160$ joules. Inserting the charging voltage E with 10 kilovolts and solving for the capacitance C results in 3.2 microfarads as value for the required condenser. Assuming furthermore the ohmic resistance of the loaded high-frequency generator to be 2,500 ohms, the time constant will be about $8 \times 10^{-3}$ second. The latter value is figured according to the formula $t=R \times C$, which applies to condenser discharges and where $t$ is the time constant $(8 \times 10^{-3})$, R is the resistance (2,500), and C is the capacitance (3.2).

As indicated by this rough example, it is possible to achieve very short heating durations by the method of this invention. Durations as short as about $10^{-4}$ second can be obtained with lower condenser charges when minute work pieces, requiring a considerably smaller amount of heat, are to be hardened.

In watch pivots, for instance, it is desirable to obtain outer hardened skins of only about 10 microns thickness and not to harden the material therebeneath. The penetration of the induced eddy-currents can be readily reduced to such small values by selecting a correspondingly high frequency, say 20 megacycles. The difficulty encountered in such cases when heating by prior induction-heating methods was that the center of such parts became also heated to hardening temperatures on account of the prolonged on-periods of the heating high frequency. Such hardening temperatures of the inner portions of the parts, unfortunately, set up strains in the material during quenching and caused brittleness of the work so treated.

Not so in hardening by the method of this invention. Here such extremely short heating durations can be reached that even in the smallest objects, such as shafts of 0.5 millimeter in diameter, the heat penetrates so little that the cold-remaining center can absorb the heat from the induction-heated skin, being only a few microns thick, without attaining hardening temperatures itself. This fact of fast heat absorption and quick temperature reduction renders quenching unnecessary in many cases.

By extensive experimental tests and measurements it has been determined that in employing the present method, hardening temperatures between 800 and 900 degrees centigrade, as generally applied in hardening practice, do not result in sufficient hardening on account of the extremely short heating and quenching durations. Changes in the composition of steel, which are necessary for hardening and consist chiefly in the conversion of pearlite carbon or austenite into martensite or hardening carbon, require at the ordinary hardening temperatures longer durations than provided by the impulse method of this invention. The same is true for dissolving the graphite in the ferrite crystals of steel, which is also essential for good hardening.

As a consequence thereof, it is one of the discoveries of this invention that particularly the dissolution of graphite can be sufficiently accelerated by employing higher temperatures than are generally applied in common hardening, say for instance 1,200 degrees centigrade. Such higher temperatures enhance considerably the dissolving rapidity of graphite, but, if applied for prolonged periods, they lead to rupture strains and so-called quenching cracks. However, they can cause no bad results in such thin surface skins as are heated by the present impulse method. Giving due consideration to this fact, it is, according to this invention, advisable to operate with such condenser charges as are necessary to effect heating of the outer skin of the work to a higher hardening temperature than generally applied, and thus achieve in spite of shorter heating periods a perfectly hardened surface skin.

The transfer of the high-frequency energy by induction heating from the heater coil into such small parts as pivots and shafts for watches or the like requires extraordinary concentration of the heating effect in smallest spaces. Thus, to achieve good thermal and electrical efficiency, it becomes necessary to adapt the induction heater circuit very closely to the tuned inductance coil of the oscillator circuit of the high-frequency generator. Such close coupling is preferably in the form of a high-frequency transformer and is illustrated in Fig. 2 where 7 indicates the tuned inductance coil of the generator and 8 the secondary to which heater coil 5 is connected. The self-inductance of coil 5 must thereby be at least equal to or higher than the self-inductance of coil 7. Induction heater coil 5, having a diameter of only one millimeter and about 1 to 4 turns, can only then have enough self-inductance when wound from very thin wire. Extensive experimental measurements have shown that for a frequency of about 30 megacycles a suitably dimensioned heater coil has an inside diameter of one millimeter, a wire diameter of 0.7 millimeter, a pitch of 0.8 millimeter, and consists of 4 turns giving an overall length of 3.1 millimeters. Such a coil, shown as a 10-times-enlarged perspective view in Fig. 3, has, owing to its favorable relation between length and diameter and its relatively high number of turns, sufficient self-inductance.

According to this invention it is furthermore advisable to employ for impulse induction heating, heater coils with one or several turns of thin enameled or bare copper or silver wire having sufficient heat-storing capacity so that they do not overheat because of incurring ohmic and inductive losses. Natural or artificial cooling must thereby be so correlated and adjusted that the heat produced in the heater coil by one discharge pulse is dissipated during the following interval before a subsequent pulse occurs.

Since the electronic vacuum tubes of the high-frequency generator and the oscillating circuit carry current during only a small fraction of the entire operating time, these components need electrically to be dimensioned only for an output which is figured by assuming an average as a continuous load. Assuming for instance, heating durations of $1/100$ second, intervals of one second, and a pulse energy of 10 kilowatts, dimensioning for a continuous rating of only $10/100$ kilowatts or 100 watts is necessary in regard to heat dissipation if otherwise all elements are strong enough to withstand the high-voltage pulses and heavy instantaneous currents.

From the previous description it is clear that the quantity of heat introduced into the work and therewith the hardening temperature can be varied by changing the charge of the condenser, and this charge can readily be controlled by varying the charging voltage. The heating effect and consequently hardening or soldering temperatures can thus be supervised by an instrument indicating the voltage across the condenser at the instant of discharge. An arrangement for such indication is illustrated in Fig. 4, where a voltmeter 9 is shown connected across condenser 1. Since the energy stored in the condenser is proportional to the square of the voltage according to the formula $W = \frac{1}{2}CE^2$ (W, the charged energy in joules; C, the capacitance in farads; and E, the charging voltage in volts), where $\frac{1}{2}C$ is constant, and since the over-all efficiency is constant for a given condition, it is obvious that voltmeter 9 can be calibrated to indicate directly the quantity of heat introduced into the work, and this readable in joules, B. t. u.'s, calories, or even, in case of always similar work pieces, in degrees of hardening temperature.

In order to assure uniform and constant hardening results independent of voltage fluctuations, this invention provides control means in the condenser charging and discharging circuits, which become effective in adjusting the charging voltage to a predetermined value and block the discharge releasing means until the instant at which the proper voltage prevails. One of the many forms that such control means according to this invention may take is indicated in Fig. 5 where the switching means for releasing discharge pulses is shown as a double-throw switch 4a actuated by a polarized or differential relay 10. The switch 4a is kept in its normal position by a spring 11 and closes in this position the charging circuit of condenser 1. When actuated by relay 10, switch 4a moves into the position indicated as dotted line in the figure and closes the condenser discharge circuit for releasing a discharge pulse. Relay 10 is energized by differential action of two coils 10a, 10b, of which coil 10a is connected across the condenser 1 and its energizing effect is directly proportional to the voltage on the condenser which is the charging voltage. The other coil 10b lies in an independent circuit which includes a suitable power source shown as battery 12, a variable resistor 13, an ammeter 14, and a manually operated switch 15. The current in coil 10b and thus its energizing effect can be adjusted to a predetermined value by means of variable resistor 13 and ammeter 14. After such a current value has been properly set, it is clear that relay 10 will only then move switch 4a into its discharge position when coil 10a produces a given energizing effect which depends on the condenser charging voltage. Thus closing of manual switch 15 will only then release a discharge impulse when the voltage on the condenser has a proper value, that is, when the stored energy is just right for producing a certain heating effect. It will be understood that automatic constant voltage means can be incorporated in the charging circuit, or that voltage adjusting means for the charging voltage can be interlocked with manual switch 15, or that said control means may take some different form, without departing from the invention as claimed.

When hardening finished and polished precision parts, it is mostly desirable to maintain the finished surfaces of such parts in their untarnished condition in order to avoid subsequent polishing. This can be achieved by conducting the hardening process within a protective atmosphere of hydrogen or noble gases. Such protection can readily be incorporated in the impulse hardening method of this invention, and a preferred arrangement is shown in Fig. 6. Hydrogen gives good protection and has favorable heat dissipating qualities but is liable to be the cause of explosive eruptions at the higher temperatures involved in this method. It is safer to employ noble gases, preferably argon, and this can be done in an economical manner by letting a stream of such gas impinge upon the work only during the instant of heating. For this purpose a mechanical or electro-pneumatical valve 16 is interposed in a gas line 17 leading from a noble gas supply 19 through a pressure reduction valve 18 to the ejection nozzle 20 near the heater coil 5. Valve 16 is normally closed and can be opened by energizing its solenoid by closing switch 21. Switch 21 is interlocked with switch 4 which, as previously mentioned, is provided to release discharge pulses, and both switches can be combined in the form of a two-pole switch as indicated in Fig. 6. It is clear that this switching unit can be so constructed that contacts 21 close in advance of contacts 4 and opens later than contacts 4 so that enveloping of the work piece 6 with protective gases begins sooner and lasts longer than the actual heating impulse. In some cases it may be desirable to utilize such gas stream also for cooling of the heater coil 5 and to therefore extend the gas ejection to last throughout the intervals between heating pulses or throughout parts thereof.

It will be realized from the foregoing description that in the present hardening method the condenser charge represents the stored energy for effecting the individual hardenings. For each hardening impulse the condenser charge must be switched upon the high-frequency generator 3. The electrical connection, instantly established in the discharge circuit by switch 4, needs not to be maintained longer than necessary for complete discharge of the condenser. For continuous and speedy operation of such a hardening outfit it is desirable to interrupt such connection quickly at cessation of discharging in order to recharge immediately in readiness for a subsequent hardening impulse. For effecting such ultrashort-time switching, this invention in a modified embodiment employs for actuation of the discharge circuit closing switch a relay instantly energized by the discharge of an auxiliary condenser. Such an arrangement is shown in Fig. 7. The auxiliary condenser 23 is preferably charged from the same current source as the main condenser 1 and the charging voltage and thereby the quantity of charged energy can be controlled by a potentiometer 24. Interposed in the discharge circuit of condenser 23 is the energizing coil 27 of relay 25 and a manual switch 26 which when closed releases the charge of the auxiliary condenser through said relay coil. To reach the results intended by this invention, it is important that the energy charge of condenser 23, which, as already stated, can be varied by adjusting the charging voltage by means of potentiometer 24, is of such value that it suffices for effecting forceful engagement of the switch contacts, for moving the relay armature ($W=F \times s$; where W is the required energy, F the force, and $s$ the stroke), and some additional energy for accelerating and for overcoming friction. When thus the available energy is properly selected, it can be achieved that the switch contacts touch each other for only a short instant and immediately part again. If the ohmic resistance of the relay coil is made low enough, a point can be reached at which the discharge of the auxiliary condenser is faster than the mechanical action of switching. Thus, it is possible to get readily contacting durations of the order of 1 to $2/100$ second, durations sufficiently short for achieving the desired result of circuit closure in the main discharge circuit lasting not longer than necessary for just releasing the charge of condenser 1.

In order to attain very short hardening durations for hardening ultra-thin surface skins, it is, in accordance with this invention, necessary to convert the charge of the condenser into high-frequency oscillating energy very rapidly. This in turn requires heavy emission currents through the electronic tubes of the high-frequency generator. In the example heretofore given, where the ohmic resistance is assumed to be 2500 ohms and the voltage is 10 kilovolts, the average anode current is 4 amperes. For class B or class C operation, the emission of the tubes in above case must be good for at least twice this value, that is, for 8 amperes minimum. Higher emission values of the tubes result in shorter hardening durations. For practicing the impulse hardening method according to this invention, it is therefore advisable to use high-frequency generator tubes of highest cathode emission, preferably triodes with thoriated tungsten cathodes, which allow operating at high voltages and at very high emission currents.

While the description of this invention has generally been limited to some specific arrangements as used especially for induction hardening of minute work pieces, it is to be understood that the same principles can be applied in precision brazing and soldering or in heating of small objects for other treatments, and that various modifications of circuits and circuit elements can be made without departing from the scope of the appended claims.

What I claim is:

1. An induction heating circuit comprising a direct-current high-voltage source, a condenser to be charged from said source with a definitely measured given quantity of electrical energy, a thermionic vacuum tube high-frequency generator connected to said condenser and operative to convert the charge of said condenser into high-frequency energy, an induction heater element connected to said high-frequency generator and adapted to receive the work to be heated by said measured and converted quantity of electrical energy, and means interposed between said condenser and said high-frequency generator for switching said condenser momentarily upon said high-frequency generator so that said measured electrical charge becomes effective in heating the work to that desirable temperature condition by which the measured given quantity of electrical energy charged in said condenser has been predetermined.

2. An induction heating circuit as in claim 1 wherein the measured quantity of electrical energy charged in said condenser is switched upon said high-frequency generator by said switching means in making instantaneous contact so that the contact closing time is substantially equal to the discharge time of said condenser when discharging into said high-frequency generator.

3. An induction heating circuit as in claim 1, wherein said induction heater element represents a coil less than 10 millimeters in diameter having less than 4 turns.

4. An induction heating circuit as in claim 1, wherein said induction heater element consists of a few turns of wire having sufficient heat capacity to prevent that without artificial cooling its temperature rises above the safe operative temperature limit during one heating impulse when its temperature is below a predetermined value at the initiation of such impulse.

5. An induction heating circuit comprising a condenser, a thermionic vacuum tube high-frequency generator connected to said condenser and operative to convert the charge of said condenser into high-frequency energy, an induction heater coil connected to said high-frequency generator and adapted to receive the work to be heated, an electrical current source connected for charging said condenser, indicating means connected across said condenser and being calibrated to indicate the charged energy directly in thermal units, and interlocking means preventing the release of a discharge of said condenser when a predetermined charging voltage value does not prevail.

6. An induction heating circuit comprising a storage condenser to be charged with a predetermined quantity of electrical energy, a thermionic vacuum tube high-frequency generator associated with said condenser and operative in converting the charge of said condenser into an equivalent quantity of high-frequency energy, an induction heater coil coupled to the output side of said high-frequency generator and adapted to receive the work to be heated by said converted condenser charge, switching means interposed between said condenser and said high-frequency generator and including a switch, a relay actuating said switch, an energizing coil for said relay, an auxiliary condenser in circuit with said energizing coil and adapted to be charged with a proper quantity of electrical energy necessary for just moving said switch into closed position and for covering the mechanical losses, and a manual switch interposed between said relay and said auxiliary condenser.

References Cited in the file of this patent

UNITED STATES PATENTS

| | | |
|---|---|---|
| 1,837,144 | Bethenod | Dec. 15, 1931 |
| 2,137,351 | Schlesinger | Nov. 22, 1938 |
| 2,276,994 | Milinowski | Mar. 17, 1942 |
| 2,422,417 | Hutchinson | June 17, 1947 |
| 2,433,371 | Klemperer | Dec. 30, 1947 |
| 2,440,892 | Callender | May 4, 1948 |
| 2,441,822 | Klemperer | May 18, 1948 |
| 2,446,202 | Vang | Aug. 3, 1948 |
| 2,464,239 | Klemperer | Mar. 15, 1949 |
| 2,473,915 | Slepian et al. | June 21, 1949 |
| 2,491,348 | Williams | Dec. 13, 1949 |
| 2,594,420 | Gillespie | Apr. 29, 1952 |
| 2,623,176 | Witsenburg et al. | Dec. 23, 1952 |
| 2,629,811 | Cachat | Feb. 24, 1953 |
| 2,640,908 | Welch | June 2, 1953 |
| 2,650,288 | Bradley et al. | Aug. 25, 1953 |
| 2,662,162 | Blok | Dec. 8, 1953 |